United States Patent
Groche

[11] Patent Number: 5,913,947
[45] Date of Patent: Jun. 22, 1999

[54] LOCKING DEVICE FOR CAR SEATS, ESPECIALLY MOTOR VEHICLE SEATS

[75] Inventor: Peter Groche, Kaiserslautern, Germany

[73] Assignee: Keiper Recaro GmbH, Remscheid, Germany

[21] Appl. No.: 09/049,382

[22] Filed: Mar. 27, 1998

Related U.S. Application Data

[63] Continuation of application No. 08/505,234, Sep. 16, 1996, Pat. No. 5,782,138.

[30] Foreign Application Priority Data

Dec. 20, 1993 [DE] Germany ............................. 43 43 463

[51] Int. Cl.$^6$ ....................................................... B60N 2/08
[52] U.S. Cl. ............................................. 74/527; 248/429
[58] Field of Search ..................... 74/526, 527; 248/429; 297/216

[56] References Cited

U.S. PATENT DOCUMENTS

| | | |
|---|---|---|
| 2,463,771 | 3/1949 | Hunz . |
| 3,524,677 | 8/1970 | Louton ................... 297/216 |
| 3,714,843 | 2/1973 | Bracey . |
| 4,189,957 | 2/1980 | Gedig et al. . |
| 4,712,759 | 12/1987 | Sugama et al. . |
| 4,787,667 | 11/1988 | Nishino ............................. 248/430 X |
| 4,961,559 | 10/1990 | Raymor ................................... 248/429 |
| 5,564,315 | 10/1996 | Schüler et al. . |

FOREIGN PATENT DOCUMENTS

| | | |
|---|---|---|
| 0 094 438 | 11/1983 | European Pat. Off. . |
| 0 408 932 B1 | 1/1991 | European Pat. Off. . |
| 0 441 078 | 8/1991 | European Pat. Off. . |
| 2 395 858 | 1/1979 | France . |
| 41 20 616 A1 | 3/1993 | Germany . |
| 42 42 895 | 11/1993 | Germany . |
| 43 37 293 | 12/1994 | Germany . |
| 6-171415 | 6/1994 | Japan . |
| 2 253 999 | 9/1992 | United Kingdom . |

OTHER PUBLICATIONS

International Search Report dated May 18, 1995 (3 pages).

*Primary Examiner*—Vinh T. Luong
*Attorney, Agent, or Firm*—Blank Rome Comisky & McCauley LLP

[57] ABSTRACT

A locking device for car seats for use in motor vehicle seats having two parts, which can be adjusted continuously relative to each other. The locking device includes a rail with a row of snap-in holes which extend in the longitudinal direction and are separated from each other by web-like material sections. The device includes locking teeth which can be moved at right angles to the rail and continuously engage with the snap-in hole without play in the direction of adjustment.

27 Claims, 10 Drawing Sheets

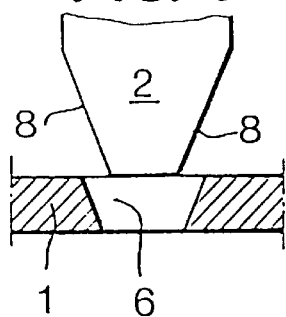
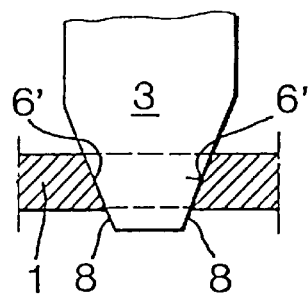
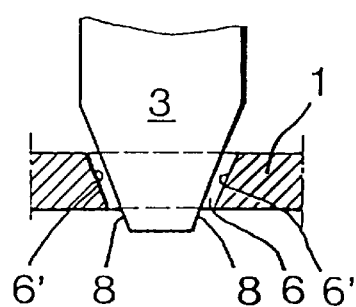
FIG. 3   FIG. 4   FIG. 5
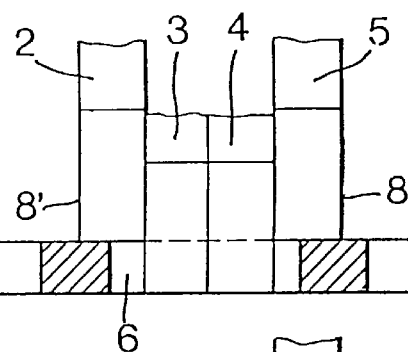
FIG. 6
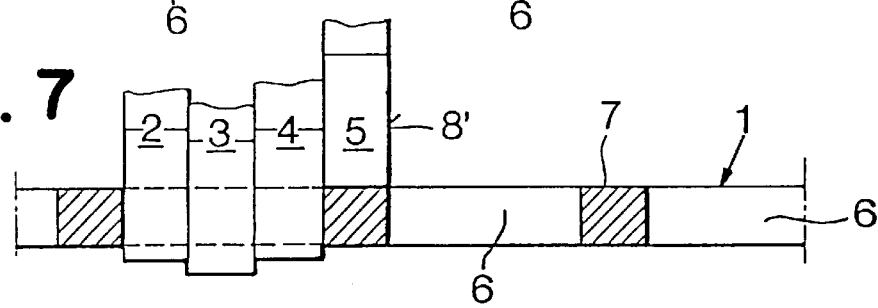
FIG. 7
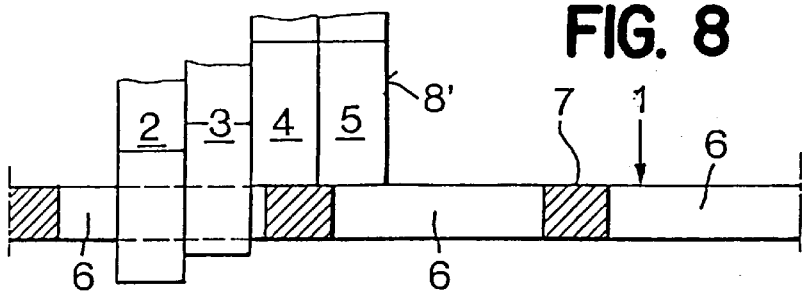
FIG. 8
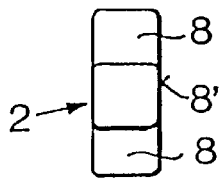
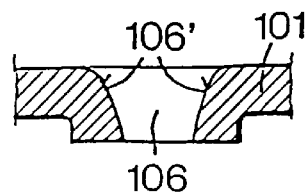
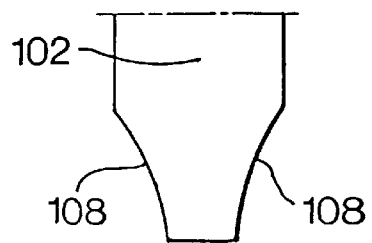
FIG. 9   FIG. 11   FIG. 10

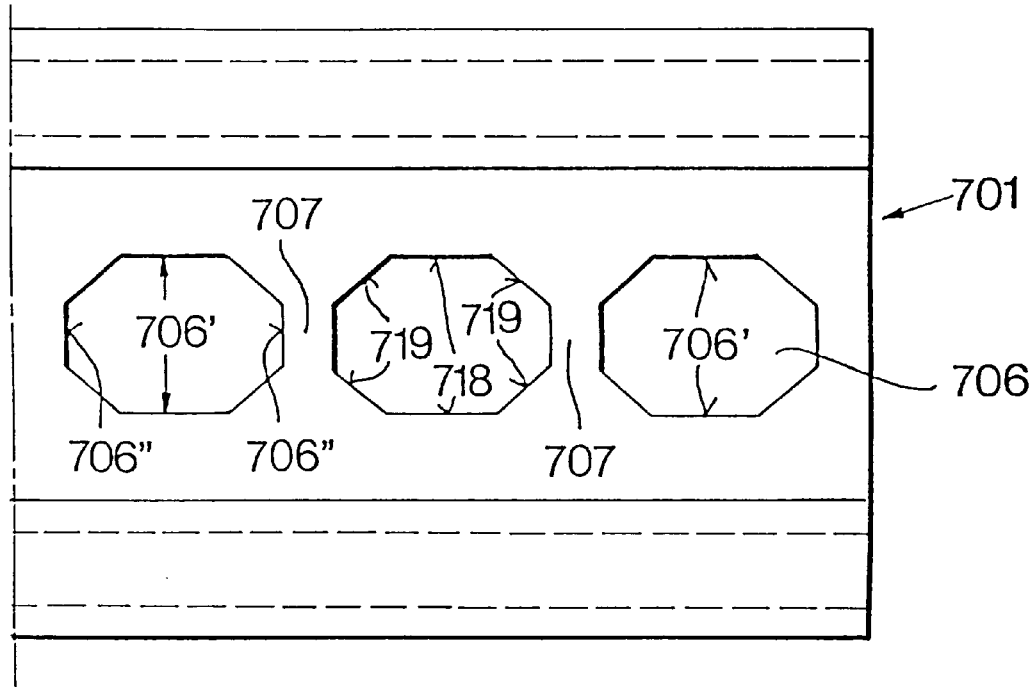
FIG. 32
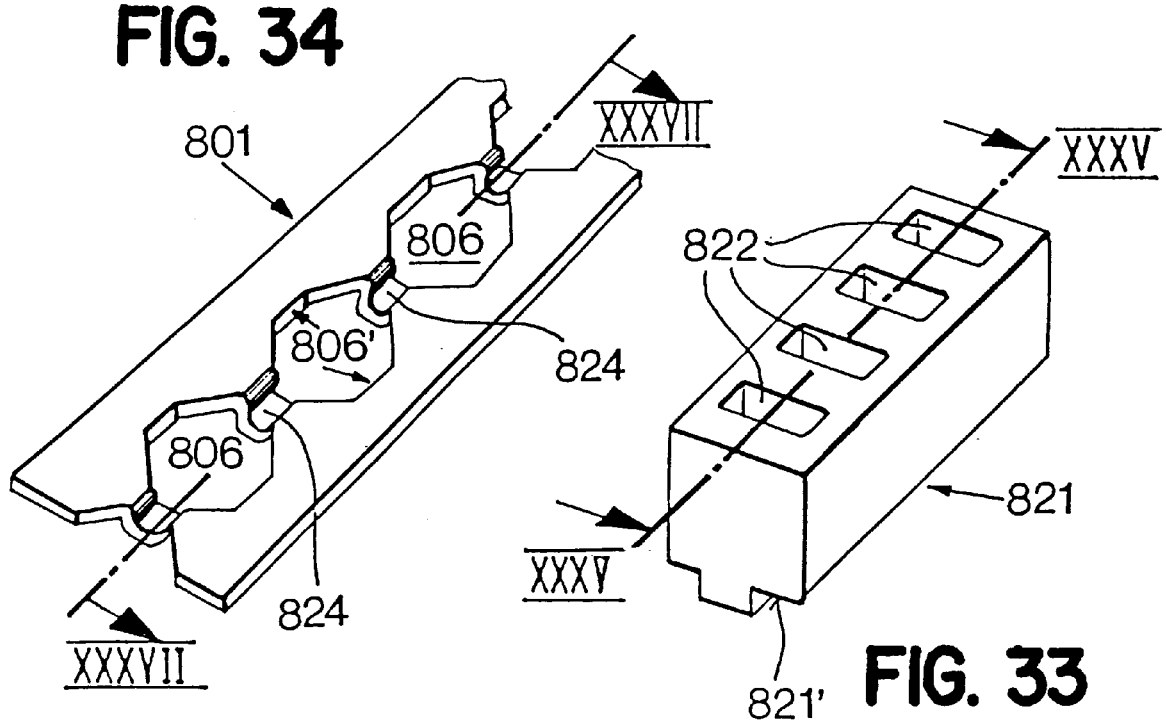
FIG. 34
FIG. 33

LOCKING DEVICE FOR CAR SEATS, ESPECIALLY MOTOR VEHICLE SEATS

RELATED APPLICATION

This application is a continuation of U.S. application of Ser. No. 08/505,234, filed Sep. 16, 1996, now U.S. Pat. No. 5,782,138, issued on Jul. 21, 1998.

BACKGROUND OF THE INVENTION

The invention relates to a locking device for car seats, in particular motor vehicle seats.

In the case of prior art locking devices of this kind for two parts, which can be adjusted infinitely with respect to each other (EP 0 408 932 B1, DE 41 20 616 A1), a tight lock in each position of the parts that can be adjusted relative to each other is achieved by providing the locking teeth or the snap-in holes with an inclined face on at least one of the two sides facing in the direction of adjustment. The locking teeth's or the snap-in holes' conical shape that is produced by the inclined face(s) enables at least one section of the locking teeth to penetrate, in any position of the mutually adjustable parts, the snap-in hole(s) that is/are in alignment with said locking teeth until the surfaces facing in the direction of adjustment come to rest without play. However, the consequence of the conical shape of the locking teeth or the snap-in holes is that a load on one of the two mutually adjustable parts in the direction of adjustment results in a load on the locking teeth in the sense of a displacement out of the locking position into the release position. Since this condition places a restriction on the choice of lip angle, an infrnitely variable locking mechanism is possible only with a significant number of locking teeth.

OBJECTS AND SUMMARY OF THE INVENTION

Therefore, the object of the invention is to provide a locking device for two continuously, mutually adjustable parts of a car seat, in particular a motor vehicle seat, for which there is no danger of the locking device becoming totally or partially ineffective if the load is increased, as in the case, for example, of a crash.

According to the present invention the inclined faces point in a direction at right angles to the direction of adjustment, the consequence of loading at least one of the two parts that can be moved relative to each other in the direction of adjustment is in any case such a low force component at the locking teeth in the sense of releasing the locking mechanism that the mechanism cannot be unlocked. This situation is especially true, when the locking teeth's faces facing in the direction of adjustment exhibit no slope relative to the locking teeth's direction of movement. Yet due to the locking teeth's inclined faces facing in the transverse direction of the rail and due to the snap-in holes' inside width that varies continuously in the longitudinal direction of the rail, a tight lock is achieved in any position of the parts that can be moved relative to each other. The rail provided with the snap-in holes does not have to be a rail-shaped component. The snap-in holes can also be provided in a region of a component that extends in the direction of adjustment or in one of the two parts that can be adjusted relative to each other. Furthermore, the rail does not have to be linear. It can also exhibit a curvature.

To lock the two mutually adjustable parts in both directions of adjustment, the locking teeth have to be arranged in such a manner in the longitudinal direction of the rail that in any position of the mutually adjustable parts, except for at least one locking tooth, which causes a tight lock in the one direction of adjustment, at least one of the other locking teeth can drop in such a manner into one of the snap-in holes that in the locking position in the other direction of adjustment said locking tooth comes to rest without play against the snap-in hole.

In a preferred embodiment the snap-in holes and the locking teeth are designed symmetrically into a common symmetric plane that extends in the longitudinal direction of the rail. In the locking position the locking teeth are positively engaged with both longitudinal sides of the snap-in hole in the direction of adjustment. Insofar as it suffices for the teeth to rest against one side, the one longitudinal side of the snap-in holes can extend in the direction of adjustment. Then the locking teeth's side face facing this longitudinal side does not have to slope with respect to the direction of movement.

Anyone of the snap-in holes and the locking teeth, meshing with said holes, can produce a positive lock in both directions of adjustment, if starting from a point with maximum inside width said snap-in hole exhibits an inside width that tapers both in the one and in the other direction of adjustment. In a preferred embodiment the middle of the snap-in holes' length measured in the longitudinal direction of the rail exhibits the maximum inside width. In addition, the two halves are built symmetrically with respect to each other. Depending on whether one of the locking teeth rests against the longitudinal sides of the one or the other half, a positive locking arrangement is achieved in the one or the other direction of adjustment.

The design of the edge profile of the snap-in holes can vary. For example, at least the one of the two longitudinal sides of each snap-in hole can define a spherical edge profile. However, other edge profiles, especially such with linear segments, thus polygon shapes, are also suitable. For a spherical edge profile and for an edge profile that is symmetrical relative to the transverse center plane of the snap-in hole, a linear segment that extends in the direction of displacement and whose length is at most equal to half the thickness of a locking tooth can be provided, for example, on both sides of the transverse center plane. Therefore, the snap-in hole's center section, which extends at most over the thickness of one locking tooth, exhibits a flattening off of the edge profile that is, moreover, spherical. Polygon edge profiles have preferably the shape of a double trapezoid. At the same time the longer of the two parallel trapezoidal sides of both trapezoids in the transverse center plane of the snap-in hole and the two shorter trapezoidal sides define the two lateral sides of the snap-in hole. In the case of such an edge profile it is advantageous to form the locking tooth's areas of contact from two flat regions, which define an edge profile that corresponds to the edge profile of the snap-in holes.

Provided the longitudinal sides of the snap-in holes run parallel to the locking teeth's direction of movement, the region, where in the locking position contact is made with the inclined face of the locking tooth, is very small. If, in contrast, the surface areas, which are opposite each other in the transverse direction of the rail and which belong to both longitudinal sides of each snap-in hole, approach continuously from the mouth, facing the locking teeth, in the direction of that end of the snap-in hole that faces away from the locking teeth, and if this slope is adapted to that of the inclined faces of the locking teeth, then contact is made over a significantly larger area. However, the cost of producing inclined longitudinal sides is significantly higher than producing longitudinal sides without slope.

The contact areas of the snap-in holes and said snap-in holes themselves do not have to lie in one plane, thus, apart from the thickness of the rail, do not have to have a two dimensional shape.

The contact areas of the snap-in holes can also define a three dimensional shape. Preferably only the longitudinal sides of the snap-in holes are moved out of the region of the rails defined by the web-like sections of material, and expediently in the direction of the locking teeth. In addition to a span with one component in the longitudinal direction of the rail, the longitudinal sides of the snap-in holes have a span with a component in the locking teeth's direction of movement. To form these protruding longitudinal sides of the snap-in holes, a preferred embodiment has tooth-like material sections, which project beyond the side of the web-like material sections of the rail, said side facing the locking teeth. Generally, to form the protruding longitudinal sides, two toroidal material sections, which extend in the longitudinal direction of the rail, are more advantageous, in particular also for production reasons. Such toroidal material sections can be formed by a transverse deformation of the rail, thus resulting in two raised folds. The special advantages of such snap-in holes result in enlarged contact areas between the locking teeth and the longitudinal sides of the snap-in holes, an almost identical depth of penetration of the locking teeth in all positions of the adjustable parts, and a small lift for moving the locking teeth out of the locking position into the release position. The latter results in a decreased space requirement for the locking device, a feature that is also an important advantage. Furthermore, in the locking position the locking teeth do not have to project beyond the side of the rail facing away from said locking teeth.

To guarantee that the locking teeth rest without play against the lateral faces of the snap-in holes even if the locking teeth engage with the snap-in holes where the inside width is the largest, the locking teeth's maximum width, measured in the transverse direction of the rail, is in the region engaging with the snap-in holes preferably somewhat larger than the maximum inside width of the snap-in holes on the rail side facing the locking teeth.

To ensure that not only the longitudinal edges of the locking teeth come to rest against the longitudinal sides of the snap-in holes, the longitudinal edges of the locking teeth can be rounded off or the contact areas of the locking teeth can be designed conically at least in the regions that engage with the snap-in holes. In the case of a crash, but not under normal stress, the longitudinal edges of the locking teeth dig into the longitudinal sides of the snap-in holes. This feature also applies to embodiments with trapezoidal edge profiles of the snap-in holes and with an adapted edge profile of that part of the locking teeth that engages with the snap-in holes.

The number of locking teeth and their arrangement can be chosen according to the requirements in consideration of the shape and arrangement of the snap-in holes. When designing the snap-in holes it is expedient to select the snap-in holes' length, measured in the longitudinal direction of the rail, in such a manner that it amounts to an integral multiple of the locking teeth's thickness, measured in the longitudinal direction of the rail. Furthermore, it is expedient to select the thickness, which is measured in the longitudinal direction of the rail and which belongs to the webs located between the snap-in holes, equal to the thickness of each locking tooth or an integral multiple of this thickness.

The locking teeth can be arranged side-by-side without space in the longitudinal direction of the rail, thus forming a stack. Then the locking teeth can support each other in the longitudinal direction of the rail. In this respect, it can be advantageous to provide at least one locking tooth, in addition to the minimum number of locking teeth required for a tight lock in any position, so that no single locking tooth ever has to absorb the entire load. The height of the stack that is measured in the longitudinal direction of the rail is chosen preferably at least equal to the snap-in holes' period, defined by a web and a snap-in hole. However, arranging the locking teeth so that the space in the longitudinal direction of the rail matches the thickness of said locking teeth is also advantageous.

Irrespective of the arrangement and number of locking teeth, it is essential that all locking teeth be individually spring-loaded in the direction from their release position into their locking position, so that they can drop individually into the snap-in holes, and can be moved jointly into the release position, so that the locking mechanism can be unlocked without any problems.

The locking teeth can be slid longitudinally in a holder, which in the locking position of the locking teeth supports their end section, engaging with one of the snap-in holes, in the longitudinal direction of the rail. Thus, the flexural stress and/or shear stress of the locking teeth and, therefore, also their dimensioning can be significantly reduced, a feature that leads above all to compactness. Preferably the end sections of the locking teeth are braced by the holder's support members, which, like the end sections of the locking teeth, project in their locking position beyond the holder's side facing the rail. To ensure that these support members, which in a preferred embodiment exhibit a tooth shape similar to the end sections, do not have a negative impact on the displaceability of the rail relative to the holder in the longitudinal direction of the rail, the rail can be provided with a longitudinal groove, which is interrupted by the snap-in holes and which can accommodate the support members, in the longitudinal region formed by the web-like material sections. Such a holder can also be designed in such a manner like a holder without support members that with said holder all of the locking teeth can be moved together out of the locking position into the release position.

BRIEF DESCRIPTION OF THE DRAWINGS

In the following the invention is explained in detail with reference to the embodiments depicted in the drawings.

FIG. 3 is a sectional view along the line III—III of FIG. 2.

FIG. 4 is a sectional view along the line IV—IV of FIG. 2.

FIG. 5 is a sectional view along the line V—V of FIG. 2.

FIG. 6 is a longitudinal view of the rail and a side view of the locking teeth for the position of the locking teeth relative to the rail that is shown in FIG. 1.

FIG. 7 is a view of the first embodiment in accordance with FIG. 6 in another position of the locking teeth with respect to the rail.

FIG. 8 is a view in accordance with FIG. 6 of the first embodiment in a third position of the locking teeth with respect to the rail.

FIG. 9 is a top view of that end of one of the locking teeth that is facing the rail.

FIG. 10 is a view of a modified embodiment of the locking teeth.

FIG. 11 is a cross sectional view of a snap-in hole of a modified embodiment.

FIG. 32 is an incomplete top view of the bottom rail according to FIG. 30.

FIG. 33 is a perspective view of a holder for the locking teeth of a locking device according to the invention.

FIG. 34 is an incomplete, perspective view of the rail belonging to the holder according to FIG. 33.

DETAILED DESCRIPTION OF THE PREFERRED EMBODIMENTS

Figure 1:
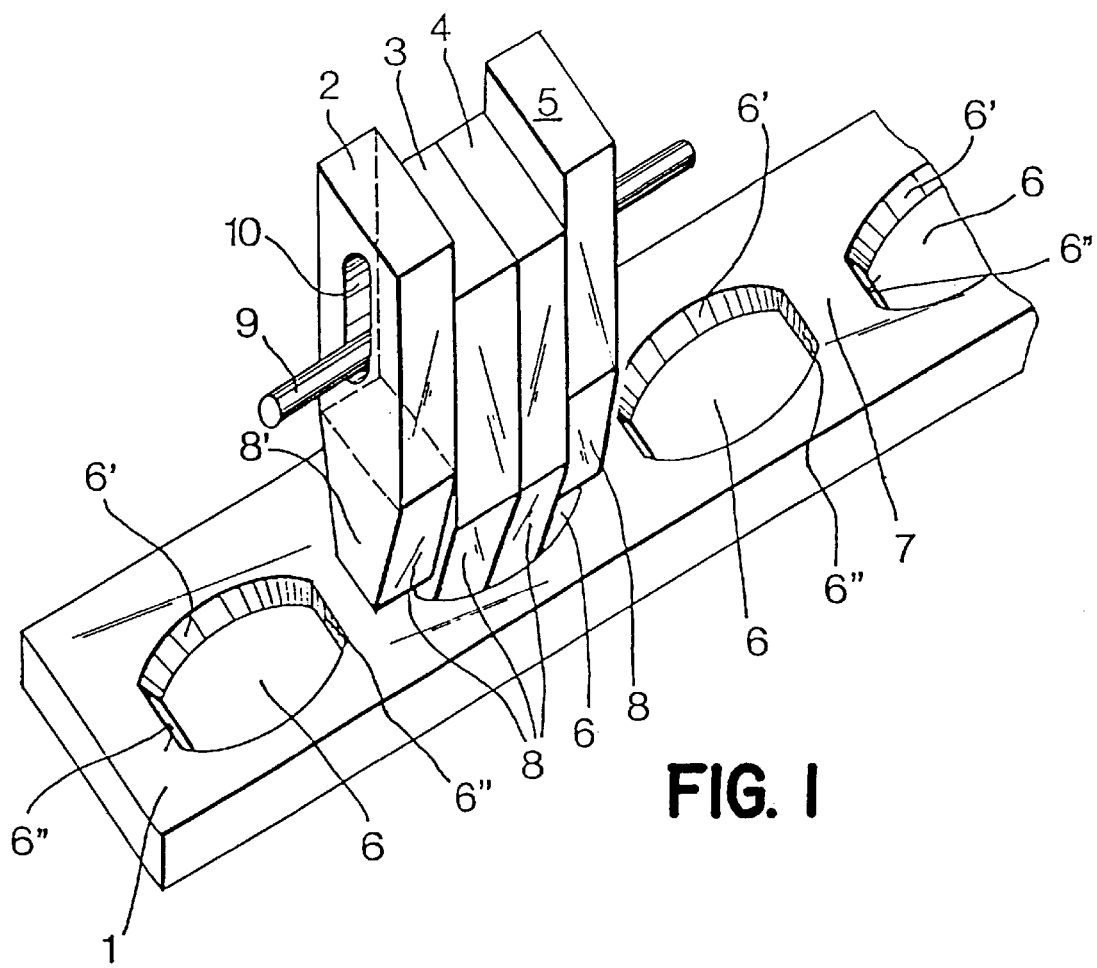
FIG. 1 is a schematic and perspective view of a first embodiment.
Figure 2:
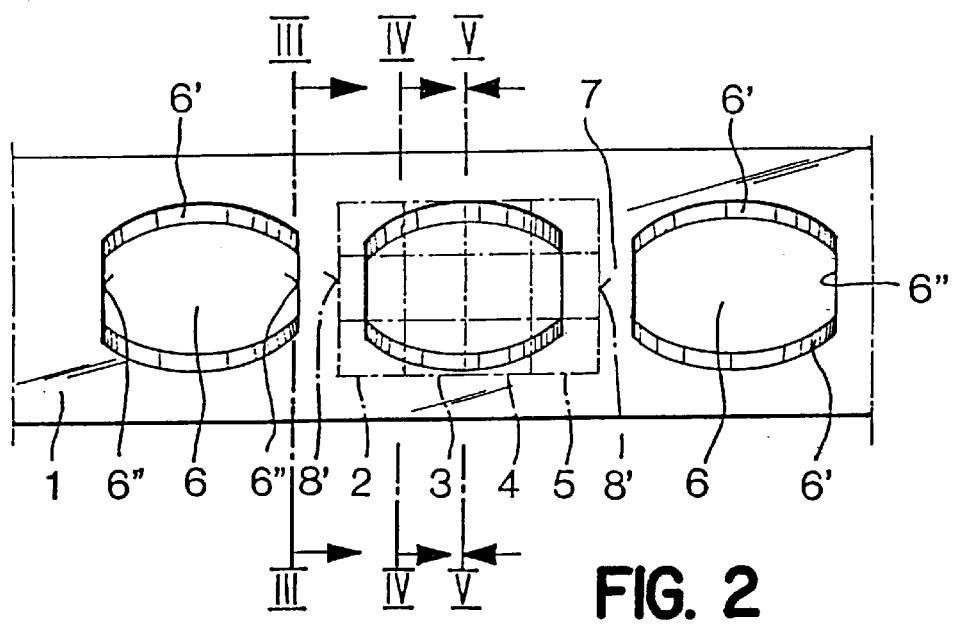
FIG. 2 is a top view of the first embodiment, where for reasons relating to a better overview the rail is shown with a solid line and the locking teeth are shown with dash-dotted lines.

As shown in FIGS. 1 and 2, a locking device for two parts, which can be adjusted continuously relative to each other along a straight line and belong to a motor vehicle seat, for example the seat frame and the guide rail, to be connected rigidly to the floor of the vehicle, comprises a snap-in locking rail 1, which is connected rigidly to one of the two parts, which can be adjusted relative to each other, or which is formed by one of these parts. For example, the snap-in locking rail 1 can be formed by one segment of the guide rail. Furthermore, the locking device includes four identical locking teeth 2, 3, 4, and 5, which are arranged in the longitudinal direction of the snap-in locking rail, thus side-by-side without space in the direction of adjustment. These bar-shaped locking teeth are guided in such a manner at the other of the two parts that can be adjusted relative to each other that they can be slid only in their longitudinal direction, whereby this longitudinal direction runs perpendicular to the direction of adjustment of the two parts, which can be adjusted relative to each other, but are braced at the other of the two mutually adjustable parts by means of guides (not illustrated) in the direction of adjustment.

The snap-in locking rail 1 is provided with a row, which extends in the longitudinal direction and includes identical snap-in holes 6, which are separated from each other by a web 7, formed by a material section of the snap-in locking rail 1. In the embodiment the web's 7 width, measured in the longitudinal direction of the rail, is chosen equal to the locking teeth's 2 to 5 thickness, measured in this direction. The snap-in holes' 6 length, measured in the longitudinal direction of the rail, is three times as large as the thickness of the locking teeth 2 to 5. Therefore, a maximum of three locking teeth can engage simultaneously with one of the snap-in holes 6. As shown in FIGS. 1 and 2, the two longitudinal sides 6' of the snap-in holes 6 define a spherical edge profile. Therefore, the snap-in holes' 6 inside width, measured in the transverse direction of the rail, increases first from the one transverse side 6" up to a maximum value over half the length, in the case of a flattened off center section up to the start of the flattening off, and then decreases again to the same degree up to the other transverse side 6". The snap-in holes 6 are designed symmetrically both with respect to their longitudinal center plane and with respect to their transverse center plane, wherein the two transverse sides 6" lie in one transverse plane each.

The locking teeth 2 to 5 have a rectangular cross sectional shape. As shown in FIGS. 1 and 2, the two flat longitudinal sides, which do not slope in the sliding direction of the locking teeth, extend in the transverse direction of the snap-in locking rail 1 and the two narrow sides in the longitudinal direction of the snap-in locking rail 1. In order for at least two of the locking teeth 2 to 5 to rest without play against the longitudinal sides 6' of one of the snap-in holes 6 when the snap-in locking rail 1 is in any position relative to the locking teeth 2 to 5, a feature that can occur when the two mutually adjustable parts are slid continuously, the locking teeth's 2 to 5 width, measured in the transverse direction of the snap-in locking rail 1, must decrease continuously up to a minimum width in the direction of the free end in the end segment facing the snap-in locking rail 1. Therefore, in the embodiment the two narrow sides 8 of the locking teeth 2 to 5 are sloped the same amount relative to the sliding direction of the locking teeth 2 to 5 in this end segment. Thus, when seen in the longitudinal direction of the snap-in locking rail 1, the end segment has the shape of a symmetrical trapezoid. To ensure that the entire thickness of the snap-in locking rail 1 rests against the longitudinal sides 6' of the snap-in hole when the locking teeth 2 to 5 engage with one of the snap-in holes 6, the longitudinal sides 6' exhibit the same slope as the narrow sides 8 of the tapering end segment of the locking teeth 2 to 5, as depicted in FIGS. 3 to 5. However, the longitudinal sides 6' can be without a slope, i.e. extend, like the traversed sides 6", in the locking teeth's 2 to 5 direction of movement. Then the snap-in holes 6 can be produced more cost effectively, for example, by punching.

The faces 8', facing in the direction of adjustment, and especially in the end segment penetrating the snap-in holes 6, are not slanted relative to the sliding direction of the locking teeth 2 to 5. Therefore, a load in the direction of adjustment on one of the two parts that can be adjusted relative to each other, results in a load on the locking teeth, which are located in the locking position, said load having no force component in the sliding direction of the locking teeth 2 to 5.

Despite the tilt of the longitudinal sides 6' of the locking teeth 3 and 5, located in the locking position, only the two longitudinal edges, which face the nearer traversed side 6" and which belong to the tapering end segment, rest against the longitudinal sides 6' of the snap-in hole 6 (as apparent from FIG. 2), at least the longitudinal edges of the tapering end segment are rounded off, as depicted in FIG. 9. Thus, the contact area is significantly enlarged and prevents the longitudinal edges of the locking teeth 2 to 5 from digging into the longitudinal sides 6' of the snap-in holes 6.

To ensure that the locking teeth 2 to 5, which are loaded by means of a prestressed spring (not illustrated) in the direction of the snap-in locking rail 1, in order to drop, independently of each other, into one of the snap-in holes 6, can be moved jointly into the release position, in which the locking mechanism is unlocked, there is a lifting mechanism, which engages with all of the locking teeth 2 to 5. In FIG. 1 this lifting mechanism is depicted symbolically by means of a lifting rod 9, which penetrates one oblong hole 10 of each of the locking teeth 2 to 5.

In one position of the mutually adjustable parts that results in the orientation of the locking teeth 2 to 5 on the snap-in locking rail 1 shown in FIGS. 1 and 2, half of the thickness of the two locking teeth 2 and 5, forming the stack end, lies on one of the webs 7. Therefore, only the two locking teeth 3 and 4 are engaged, whereby the locking tooth 3 produces a play-free, positive lock in the one direction of adjustment, and the locking tooth 4 produces a play-free, positive lock in the other direction of adjustment. As apparent from FIG. 2, but above all from FIG. 3, the locking teeth's 2 to 5 width, measured in the transverse direction of the snap-in locking rail 1, is smaller on the free end facing the snap-in locking rail 1 than the inside width of the snap-in hole 6 on the two traversed sides 6" on the bottom side facing away from the locking teeth 2 to 5. FIGS. 4 and 5 show that the locking tooth 3 rests only with the longitudinal edges, which are adjacent to the locking tooth 2 and belong to both of its narrow sides 8, against the longitudinal sides 6' of the snap-in hole 6, and that the locking teeth's 2 to 5 maximum width, measured in the transverse direction of the snap-in locking rail 1, is somewhat larger than the maximum inside width of the snap-in holes 6, measured at the rail side, facing the locking teeth 2 to 5 (as also apparent from FIG. 2).

FIG. 7 illustrates the situation following the displacement of the snap-in locking rail 1 relative to the locking teeth 2 to 5 as compared to the situation shown in FIGS. 1 to 6. Here the locking tooth 5 is aligned exactly with one of the webs 7, the locking teeth 2 to 4 drop into one of the snap-in holes 6. The penetration depth of the two locking teeth 2 and 4 is identical, but less than the penetration depth of the locking tooth 3, because the former are in alignment with the end segments, which adjoin the traversed sides 6' and belong to the snap-in hole 6, whose inside width is less than that of the center segment, with which the locking tooth 2 is in alignment.

FIG. 8 shows a situation in which the two locking teeth 4 and 5 are aligned with one of the webs 7. Therefore, only the two locking teeth 2 and 3 engage with the snap-in hole 6. Because the locking tooth 2 rests against the two longitudinal sides 6' of the snap-in hole 6 in the left half when seen from the direction according to FIG. 8, said locking tooth is positively engaged with the snap-in locking rail 1, without play, such that it will not slide to the right, as seen from the direction according to FIG. 8. The penetration depth of the locking tooth 2 is greater than that of the locking tooth 3, which in the right half of the snap-in hole 6 rests against the longitudinal sides 6', but at a shorter distance from the adjacent traversed side 6" and, therefore, in a region having a smaller inside width.

As depicted in FIG. 11, during the formation process of the snap-in holes in the region of the two longitudinal sides 106' a material section projecting beyond the snap-in locking rail 101 can be formed. FIG. 11 also shows that, instead of a trapezoidal cross sectional shape of the snap-in holes 106, a nozzle-like cross sectional shape can be provided. To this end, only the longitudinal sides 6', designed as inclined faces, have to be replaced by longitudinal sides 106' curved in the transverse direction. To ensure that for such nozzle-shaped cross sectional profiles of the snap-in holes the contact area between the locking tooth and the longitudinal sides of the snap-in hole is as large as possible, the two narrow sides of a locking tooth 102 in the end segment facing the snap-in locking rail can be designed with a concave curvature that corresponds to the convex curvature of the longitudinal sides 106', as shown in FIG. 10.

Figure 12:
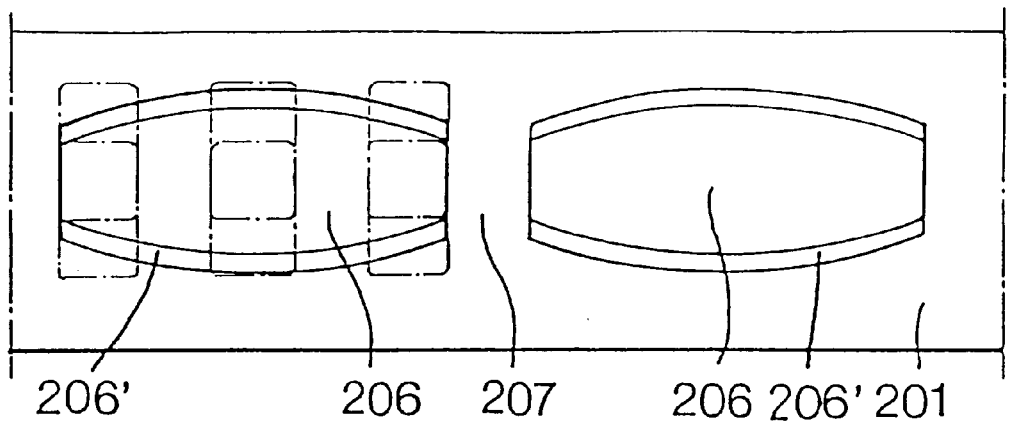
FIG. 12 is a top view according to FIG. 2 of a second embodiment.
Figure 13:
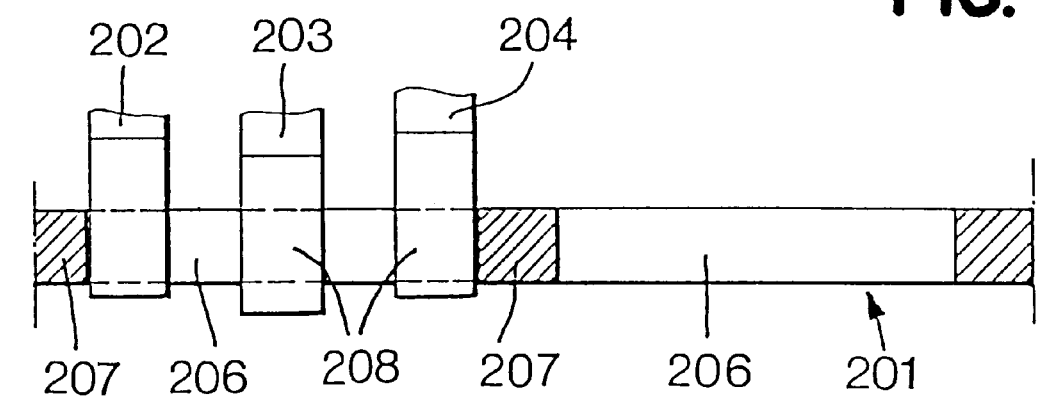
FIG. 13 is a longitudinal view of the rail of the second embodiment with a side view of the locking teeth in the position according to FIG. 12.

In the embodiment shown in FIGS. 12 to 15, the three existing, identical locking teeth 202 to 204 have the same shape and size as the locking teeth 2 to 5 of the first embodiment. However, they are spaced apart in the longitudinal direction of the corresponding snap-in locking rail 201, so that the distance is equal to their thickness measured in this direction. The snap-in locking rail 201, which, like the snap-in locking rail 1, can also be a region of one of the two parts that can be moved relative to each other, is provided with a row of snap-in holes 206, each of which is separated by a web 207, whose width, measured in the longitudinal direction of the rail, is chosen identical to the thickness of one of the locking teeth 202 to 204, as in the case of the first embodiment. The snap-in holes' length, measured in the longitudinal direction of the snap-in locking rail 201, is five times as large as the thickness of one of the locking teeth 202 to 204. Therefore, as shown in FIGS. 12 and 13, all three locking teeth 202 to 204 can engage simultaneously with one of the snap-in holes 206, whose longitudinal sides 206', defining a spherical edge profile, are sloped in accordance with the tilt of the narrow sides 208 of the locking teeth 202 to 204.

Figure 14:
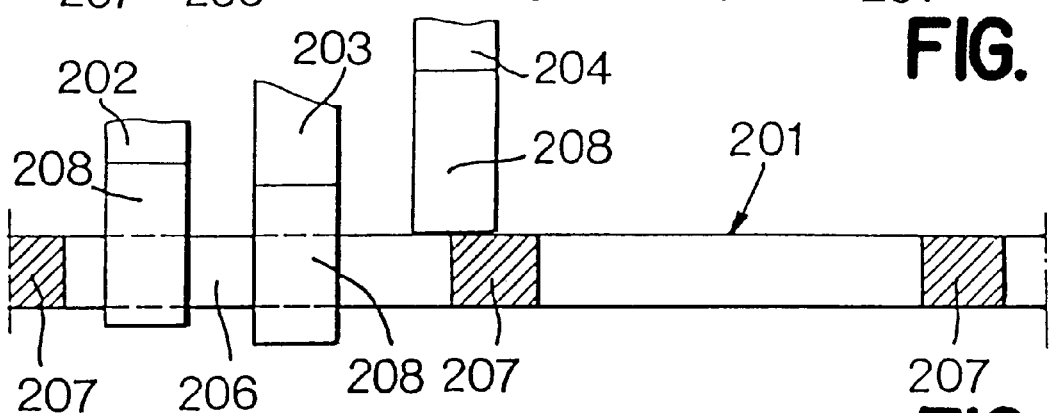
FIG. 14 is a view in accordance with FIG. 13 of the second embodiment in another position of the locking teeth relative to the rail.
Figure 15:
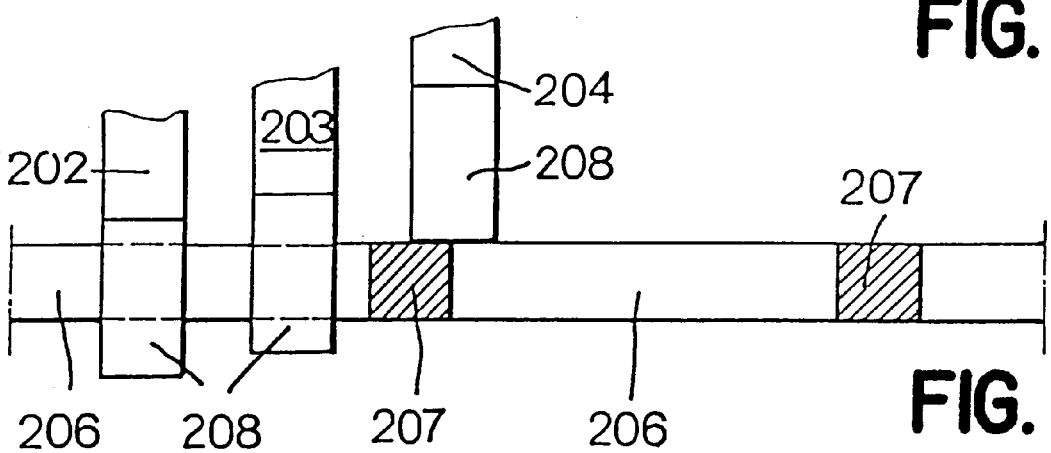
FIG. 15 is a view in accordance with FIG. 13 for a third position of the locking teeth relative to the rail.

As FIGS. 14 and 15 show, only the two other locking teeth are always in their locking position whenever one of the locking teeth 202 to 203 is aligned totally or partially with one of the webs 207. Nevertheless, even in these cases the snap-in locking rail 201 is locked without play in both directions of adjustment, because the two locking teeth located in their locking position rest against the two longitudinal sides 206' in the one or the other half of the snap-in hole; and the locking teeth's 202 to 203 faces, facing in the direction of adjustment, are not sloped with respect to their direction of displacement.

The only difference between the third embodiment, depicted in FIGS. 16 to 20, and the embodiment, depicted in FIGS. 1 to 9, lies in the different number of locking teeth and a different edge profile of the snap-in holes.

Figure 16:
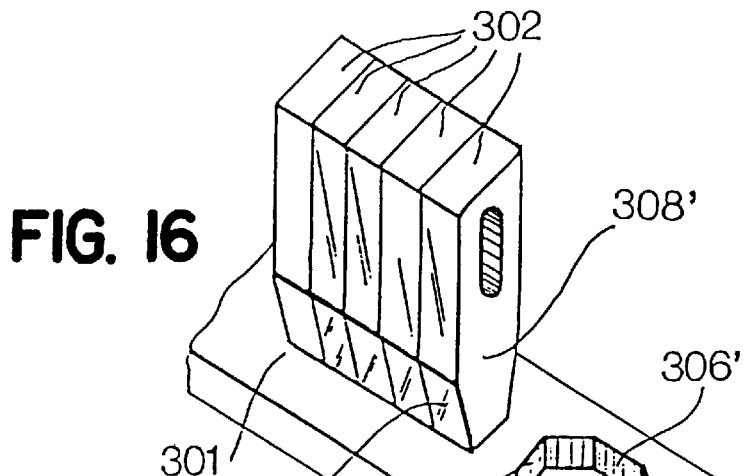
FIG. 16 is a schematic and incomplete perspective view of a third embodiment.
Figure 17:
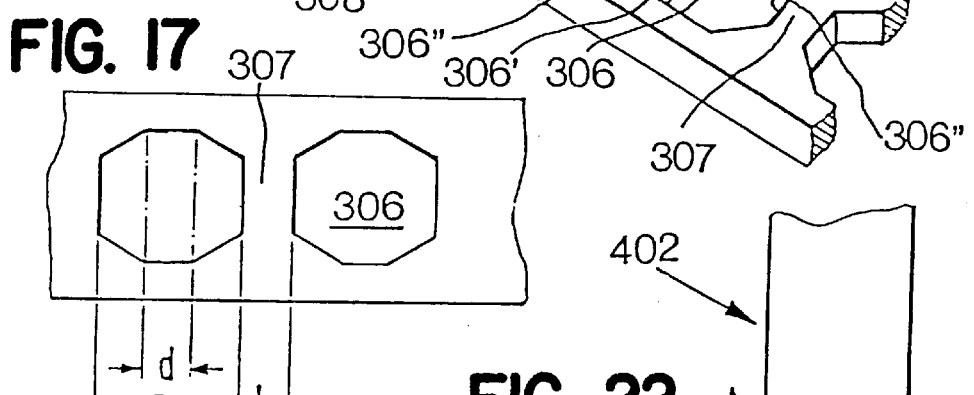
FIG. 17 is an incomplete top view of the rail of the third embodiment with a locking tooth indicated by the dash-dotted line.
Figure 18:
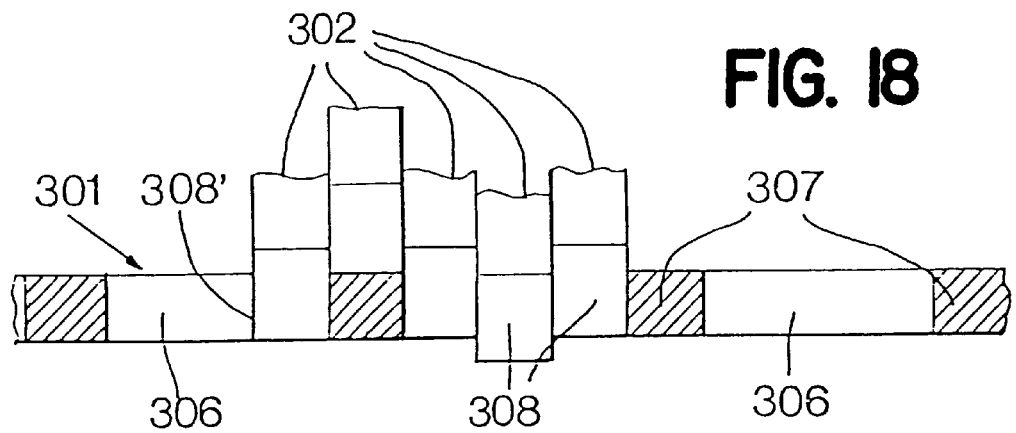
FIGS. 18 to 20 are schematic and incomplete longitudinal views of the third embodiment in the locked state for three different positions of the locked parts.

As apparent from FIGS. 16 and 17, the snap-in holes 306, arranged equidistantly in the longitudinal direction in a rail 301, have a polygon edge profile. The cross sectional area of each of the identical snap-in holes 306 comprises a center section and two end segments, designed identically as mirror images of each other. The center section has the shape of a rectangle, which extends in the transverse direction of the rail and whose two longitudinal sides form the larger base of one trapezoid each. The height of these two trapezoids that is measured in the longitudinal direction of the rail and the width of the rectangle that is measured in this direction are chosen equal to the thickness of the identical locking teeth 302 that is measured in the longitudinal direction of the rail. Since the locking teeth 302 are arranged in succession without spaces in the longitudinal direction of the rail, three locking teeth 302 can drop simultaneously into one of the snap-in holes 306, as shown in FIG. 18.

Like the locking teeth of the first embodiment, the two narrow sides 308 of each of the locking teeth 302 are sloped the same amount with respect to the sliding direction of the locking teeth 302 in the end segment, engaging with the snap-in holes 306, and in such a manner that the width, measured in the transverse direction of the rail, tapers in the direction of the bottom end of the locking tooth. Therefore, the bottom end segment of the locking teeth 302 forms a wedge. The two faces 308', facing in the direction of adjustment of the parts to be locked together, are also without slope in the end segment engaging with the snap-in holes 306.

Furthermore, neither the two transverse sides 306" nor any of the segments of the two longitudinal sides 306' of the snap-in holes 306 include any inclination relative to the direction of movement of the locking teeth 302. Thus, the cross section of the snap-in hole 306 does not vary from the rail's 301 upper side, facing the locking teeth 302, to the bottom side, facing away from the locking teeth 302.

The locking teeth's 302 width, measured in the transverse direction of the rail, at the tapered end is chosen so much smaller than the span of the snap-in holes' 306 transverse sides 306", said span being measured in the transverse direction of the rail, that one of the locking teeth 302, whose one face 308' rests against the one transverse side 306" when said locking teeth drop into one of the snap-in holes 306, an penetrate so deeply into the snap-in hole 306, that the free end terminates flush with the bottom side of the rail 301. On the other hand, the locking teeth's 302 width, measured in the transverse direction of the rail, is larger in the non-tapered region than the width of the snap-in holes 306 in their center section, so that the inclined narrow sides 308 of a locking tooth 302, aligned with the center section of one of the snap-in holes 306, can come to rest against the two longitudinal sides 306'.

For the number M of the locking teeth 302 the relation holds:

$$M > = \frac{2(a + b)}{a - d}$$

where a stands for the snap-in holes' 306 length, defined by the distance between the two traversed sides 306"; b, is the distance between two successive snap-in holes 306, said distance being equal to the width of the webs 307 between the snap-in holes 306; and d stands for the locking teeth's 302 thickness, measured in the longitudinal direction of the rail.

The result of this relation is that the parts to be locked together can be locked without play in any position of the parts with four locking teeth 302. Previously, to minimize the costs and the construction space, the number of locking teeth was chosen as small as possible. In the present invention four locking teeth would suffice for a continuous and tight lock. Yet there are, in fact, five locking teeth 302. Thus, one avoids the fact that there are positions of the parts to be locked together, in which a single locking tooth 32 would have to absorb while standing alone any forces that might occur.

In the embodiment, depicted in FIG. 18, three of the locking teeth 302 have dropped into one of the snap-in holes 306. These three locking teeth 302 are braced against each other in the longitudinal direction of the rail and can, therefore, absorb without more effort the forces that might occur, for example, in the longitudinal direction of the rail in the case of a crash. Even in this position there is no risk of overloading one of the locking teeth 302, if, for example, the locking tooth shown on the extremely right in FIG. 18 were missing, because the locking tooth 302, arranged next to it, is effective in both directions of stress; and thus, the load is taken off of the two other locking teeth 302 located in the locking position.

Figure 19:
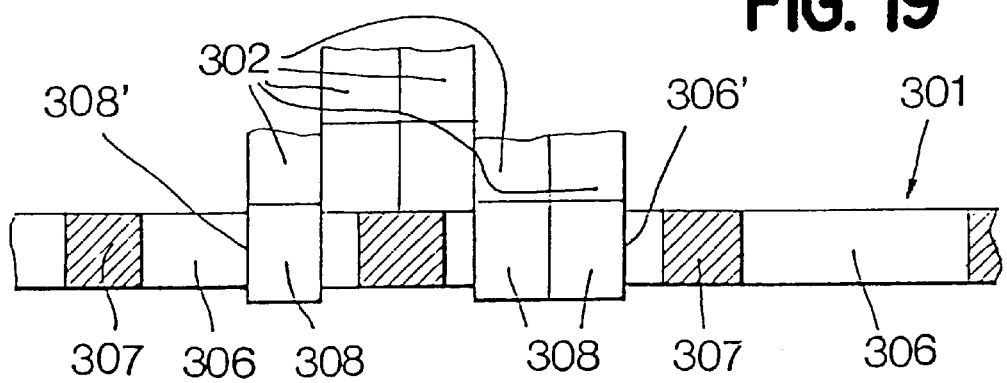

In the embodiment shown in FIG. 19, only three of the locking teeth 302 are in the locking position. If, for example, the locking tooth, shown on the extreme right in FIG. 19, were to be missing, then the two outer, free standing locking teeth 302 themselves would have to absorb the load in the one or the other direction.

Figure 20:
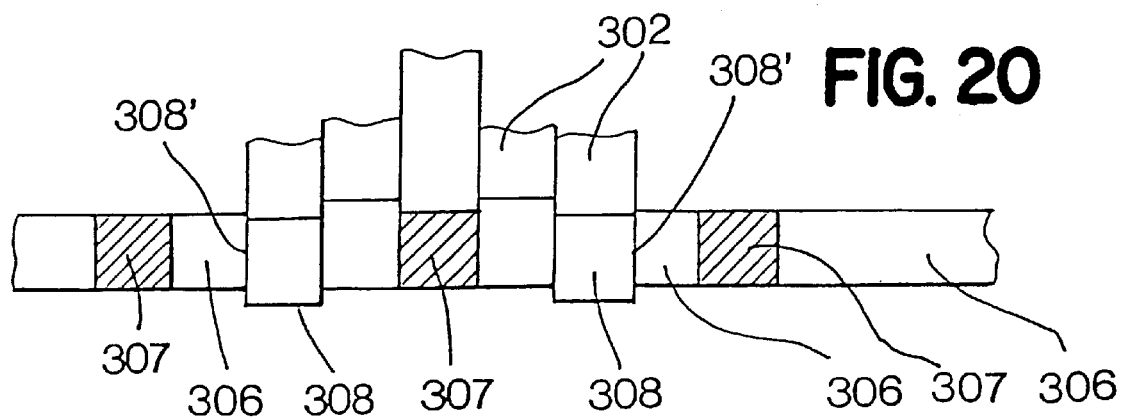

Even in the embodiment shown in FIG. 20 and in which the center locking tooth 302 stands on one of the webs 307 and the four other locking teeth 302 are located in the locking position, the lack of one of the locking teeth 302 would result in a higher load on the locking tooth 302 located next to it.

Figure 22:
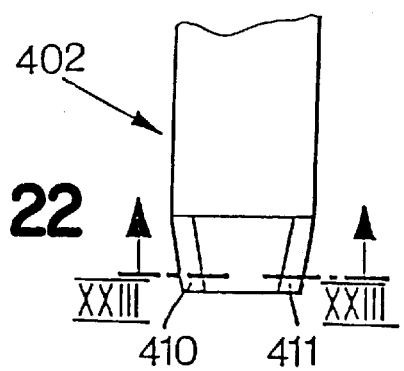
FIG. 22 is an incomplete view of a locking tooth of the fourth embodiment as seen in the direction of one of the two front sides extending in the transverse direction of the rail.
Figure 21:
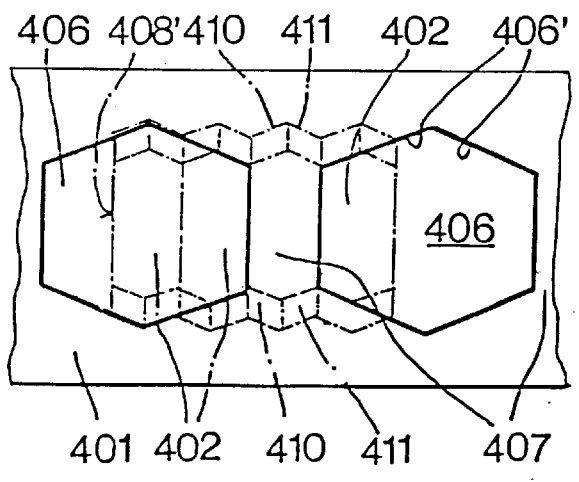
FIG. 21 is a schematic and incomplete top view of a fourth embodiment.
Figure 23:
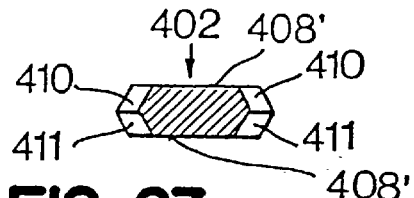
FIG. 23 is a sectional view along the line XXIII—XXIII of FIG. 22.

In the embodiment depicted in FIGS. 21 to 23 the snap-in holes 406, all of which are designed the same, have the shape of a double trapezoid, wherein the two trapezoids border each other along their longer base, which extends in the transverse direction of the rail 401. As in the third embodiment, the length of the snap-in holes 406 is three times as large as the thickness of the corresponding locking teeth 402, said thickness being measured in the longitudinal direction of the rail. Similarly the webs' 704 width, measured in this direction, is equal to this width of the locking teeth 402. The smallest and the largest width of the snap-in holes 406 and the width of the locking teeth 402 at their tapered end and in the untapered region are adjusted with respect to each other in the same manner as in the third embodiment.

As especially evident from FIGS. 22 and 23, the difference between the locking teeth 402 and the locking teeth of the first and second embodiment is the different shape of the end segment, engaging with the snap-in holes 406, in the region of both narrow sides. Instead of being defined by one single inclined face, the tapering end segment in the region of its two narrow sides is defined by two surface regions 410 and 411 each, which, as shown in FIG. 21, are arranged symmetrically to the locking tooth's 402 transverse center plane extending in the transverse direction of the rail, and form an angle, which is equal to the angle, which is the two segments of each longitudinal side 406' of the snap-in hole 406.

The consequence of this cross sectional shape of the locking teeth's 402 end segment engaging with the snap-in holes 406 is, as shown in FIG. 21, that the locking teeth 402 make linear contact with the longitudinal sides 406' of the snap-in holes 406 in the locking position. As especially evident from FIG. 23, the locking teeth's 402 faces 408' facing the direction of adjustment are not tilted, as in the case of the other embodiments.

Naturally it is also possible in the embodiment according to FIGS. 21 to 23 to provide more than the minimum number of locking teeth required for a continuous and play-free lock.

For details that have not been mentioned in the explanation of the embodiments according to FIGS. 16 to 23, reference is made to the explanations to the embodiment according to FIGS. 1 to 9, because in this respect there are no differences. This condition applies, for example, to the ability to move the locking teeth independently into the locking position owing to the force of the prestressed springs or the ability to move jointly all of the locking teeth into the release position.

Figure 24:
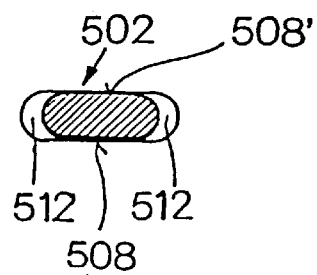
FIG. 24 is a sectional view in accordance with FIG. 23 of a modified embodiment of a locking tooth.

As FIG. 24 shows, the locking teeth 502 can exhibit, instead of the two flat surface regions 410 and 411 of the locking teeth 402, a conical surface region 512 on both narrow sides in the region of the end segment engaging with the snap-in holes. The two tilt-free faces of the locking teeth 502 are marked with the numeral 508'.

The purpose of the embodiment of the locking device of the invention that is shown in FIGS. 25 to 29 is to lock the upper rail 616, which is to be connected to the car seat and belongs to a pair of motor vehicle rails, with the bottom rail 601 to be connected to the car chassis. The upper rail 616 can be slid longitudinally in the known manner in the bottom rail 601; and owing to the intermeshing leg ends of the two rails at right angles to the longitudinal direction of the rail, said upper rail ensures that the bottom rail 601 will not unlock.

In the center between the two legs of the bottom rail 601 there is a row, which extends in the longitudinal direction of the rail and exhibits identical snap-in holes, which are spaced equidistantly apart and between each of which there is a web 607. Four identical locking teeth 602, of which only one single tooth is shown in FIGS. 25 and 27 to 29, are arranged in succession without space in the longitudinal direction of the rail, as in the case of the embodiment according to FIGS. 16 and 17. However, only three or more than four locking teeth can be provided. They have the same shape as the locking teeth 302 and the same dimensions as compared to the dimensions of the snap-in holes 606 and the webs 607. The locking teeth 602 are arranged inside the upper rail 606 (not illustrated) and guided with this rigidly connected holder, and especially in such a manner that they can be moved relative to the upper rail 616 only in their longitudinal direction, not, however, in the longitudinal direction and the transverse direction of the upper rail 616.

Like the snap-in holes 306 of the embodiment according to FIGS. 16 and 17, the snap-in holes 606 have a polygon shape. However, unlike the snap-in holes 306, the snap-in holes 606 do not lie in a flat rail-shaped material section. Rather only the two traversed sides 606", which run in the transverse direction of the rail and border the webs 607, lie on a level with the webs 607. In contrast, each snap-in hole's 606 two longitudinal sides 606', which are designed identically so as to be mirror-inverted with respect to the longitudinal center plane of the bottom fail 601, are moved out of the center segment of the bottom rail 601 that contains the webs 607 in the direction of the upper rail 616 and have a continuous course with a component in the sliding direction of the locking teeth 602. Thus, the snap-in holes 606 have a somewhat three dimensional shape.

To form the longitudinal sides 606', the bottom rail 601 includes on both sides of each snap-in hole 606 two tooth-like material sections 617, which project beyond the center segment in the direction of the upper rail 616 and all of which are designed identically and as one piece with the bottom rail 601 and are arranged in two identical rows, which are mirror-inverted with respect to the longitudinal center plane of the bottom rail 601.

Figure 25:
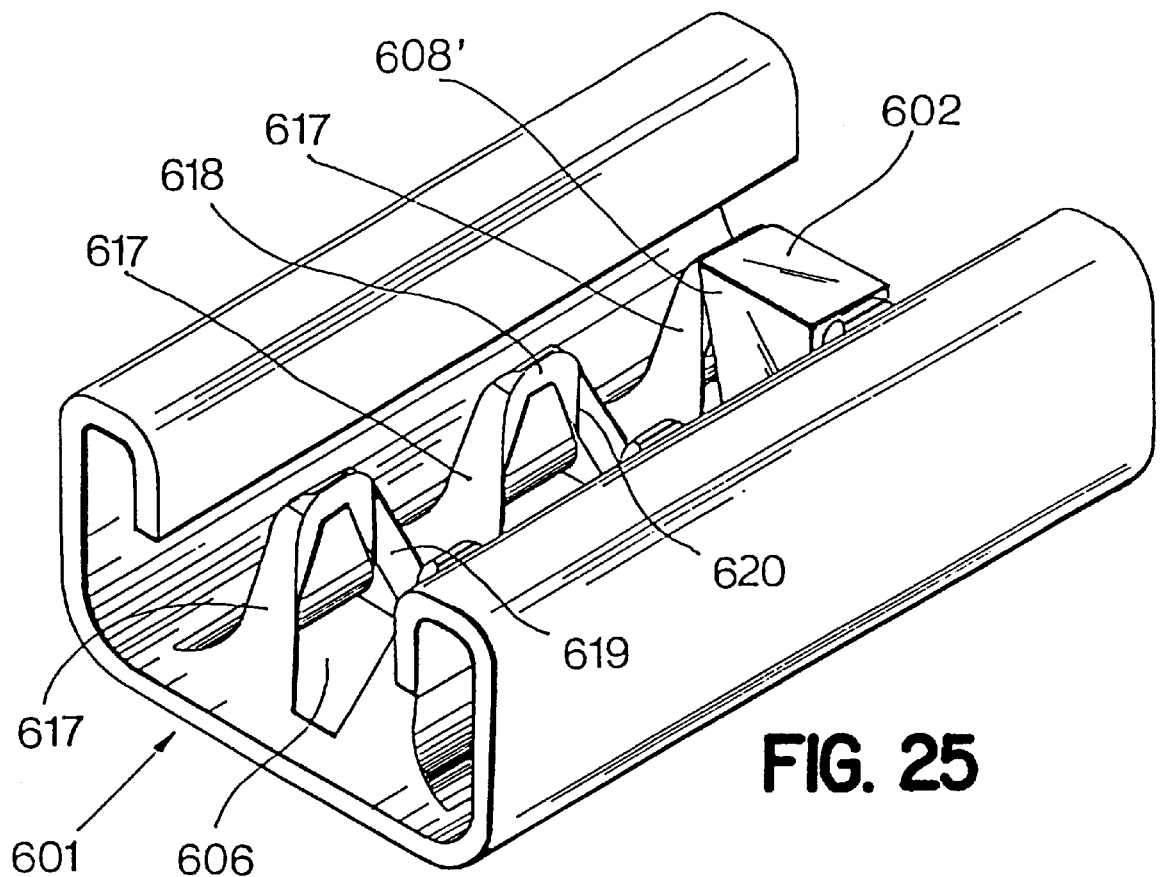
FIG. 25 is a perspective and incomplete view of the rail of a fifth embodiment and one of the locking teeth.

As shown especially in FIG. 25, the tooth-like material sections 617 are designed as hollow bodies, which are open in the direction of the tooth-like material section 617, which forms the opposite longitudinal side of the snap-in hole 606, and in the direction of the bottom rail's 601 side facing away from the locking teeth 602. The bow-shaped end face, facing the opposite tooth-like material section 617, forms the one longitudinal side of the snap-in hole 606. As in the case of the embodiment according to FIGS. 16 and 17, each longitudinal side 606' comprises a center segment 618, extending in the longitudinal direction of the rail, and an end segment 619, extending from said center segment as far as the one or the other traversed side 606". Both the center segment 618 and the end segment 619 lie in vertical planes. In contrast to the center segment 618, however, the vertical planes, containing the end segments 619, and the longitudinal center plane of the bottom rail 601 form an angle.

Figure 27:
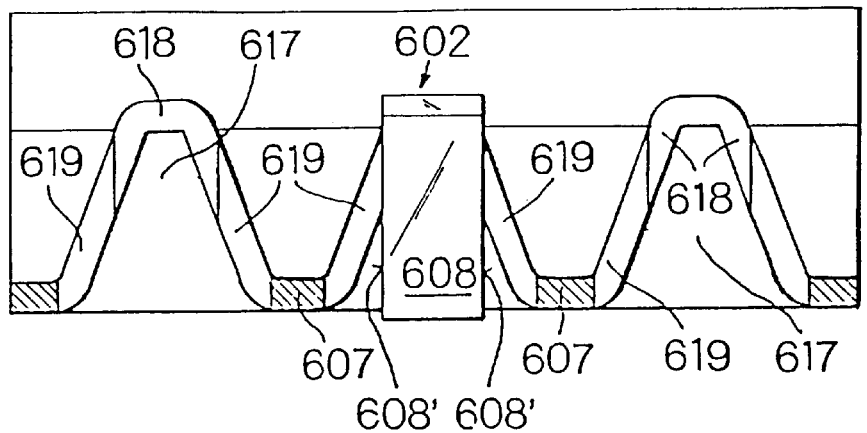
FIG. 27 is a longitudinal view of the rail according to FIG. 25 with one of the locking teeth.
Figure 28:
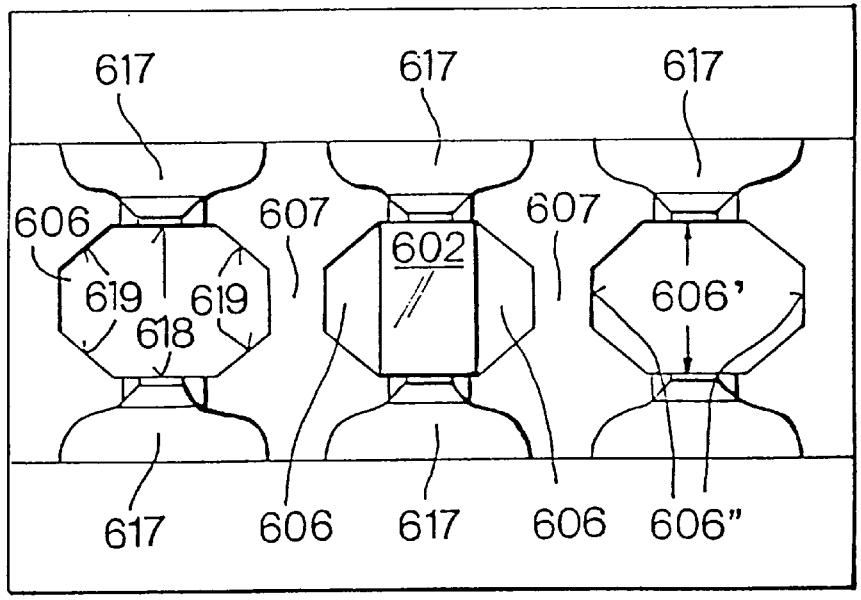
FIG. 28 is a top view of the rail according to FIG. 25 and the locking tooth.

When one of the locking teeth 602 is aligned with the center of one of the snap-in holes 606, as shown in FIGS. 27 and 28, said locking tooth's two narrow sides 608, which form the wedge-shaped end segment of the locking tooth 602, come to rest against the center segment 618 of both longitudinal sides 606'. The two longitudinal edges of the narrow sides 608' come to rest against the lines 620, along which the end segments 619 adjoin the center segment 618. Owing to the angling of the end segment 619 relative to the center segment 618, which is shown in FIG. 28, the locking tooth 602, aligned with the center of the snap-in hole 606, locks in its locking position with the upper rail 616 relative to the bottom rail 601 in both sliding directions of the upper rail 616.

Figure 29:
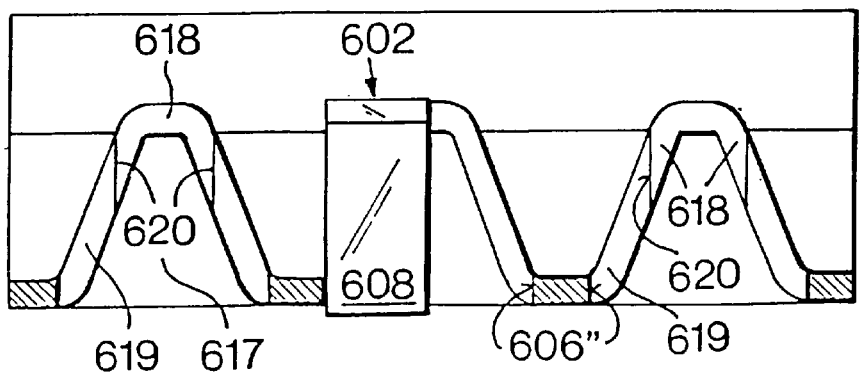
FIG. 29 is a sectional view according to FIG. 27 with the locking tooth in another position.

In FIG. 29, one of the locking teeth 602 is aligned with the one end segment of the snap-in holes 606. When the locking tooth 602 is in the locking position, its slope-free face 608' rests against the one traverse side 606". The locking tooth 602 can then lock the upper rail 616 to the bottom rail 601 only in the one direction of displacement. Locking in the other direction of displacement is brought about by means of at least one of the other locking teeth 602.

In those positions of the upper rail 616, in which the locking teeth 602 do not rest against either the center segment 618 or one of the traverse sides 606", the one longitudinal edge of the two narrow sides 608 rests against the opposite end segments 619 of the longitudinal side 606'.

Irrespective of which segment of the snap-in holes 606 the locking teeth 602 engage with the snap-in holes 606, in the locking position the protrusion beyond the underside of the bottom rail 601 is less. Preferably there is no protrusion. The lift required to move the locking teeth 602 out of the locking position into the unlocking position, does not have to be greater than the thickness of the bottom rail 601 in the region of the webs 607 plus any existing protrusion (grossly exaggerated in FIG. 27) beyond the underside of the bottom rail 601. The result is a very compact construction of the locking device. Furthermore, it is apparent from FIG. 27 that the length of that segment of the longitudinal edges of the narrow sides 608, resting against the line 260 or the end segments 619 in the locked state, is significantly greater than in the embodiment according to FIGS. 16 and 17, a feature that is also advantageous.

For other details, especially with respect to the springs, loading the locking teeth 602, and the mechanism for lifting the locking teeth 602 out of the locking position, reference is made to the explanations to the embodiment according to FIGS. 1 to 8.

Figure 30:
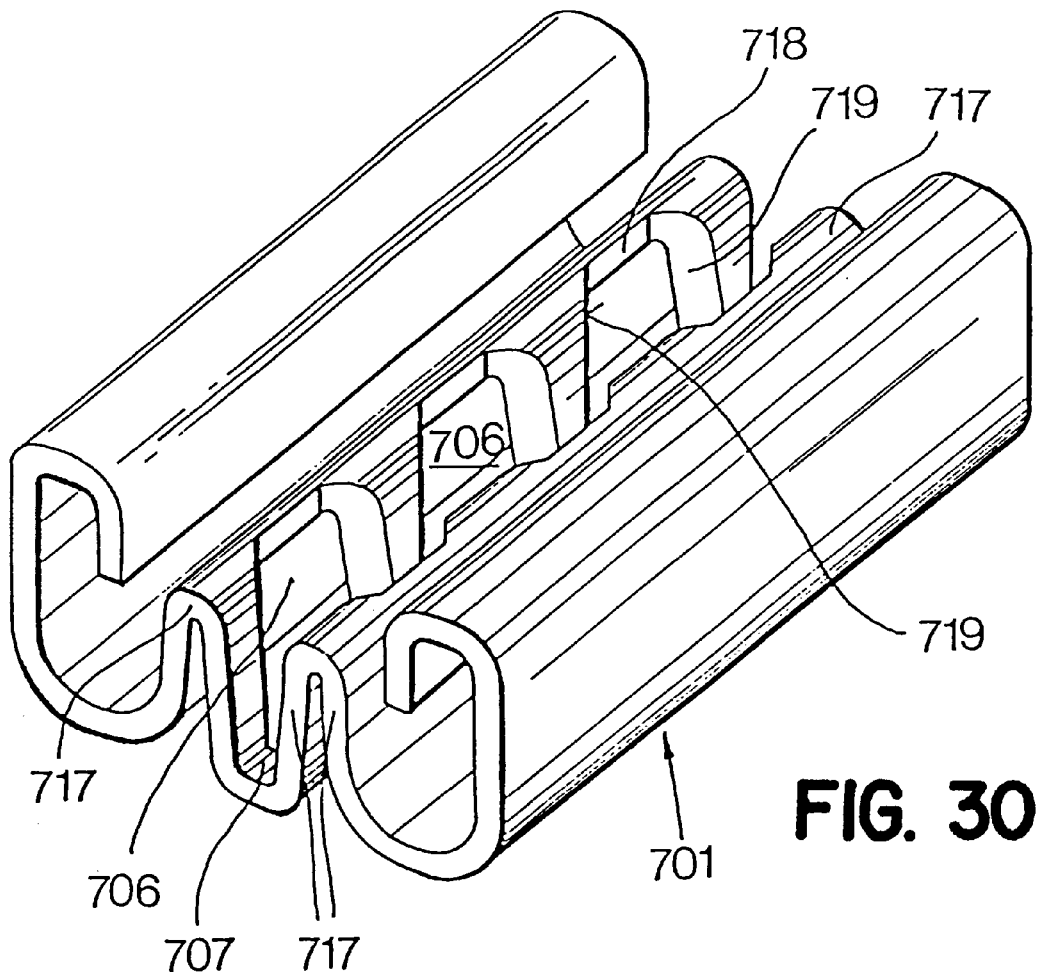
FIG. 30 is an incomplete and perspective view of the bottom rail of a pair of rails for the longitudinally adjustable motor vehicle seat with a sixth embodiment of the locking device of the invention.
Figure 31:
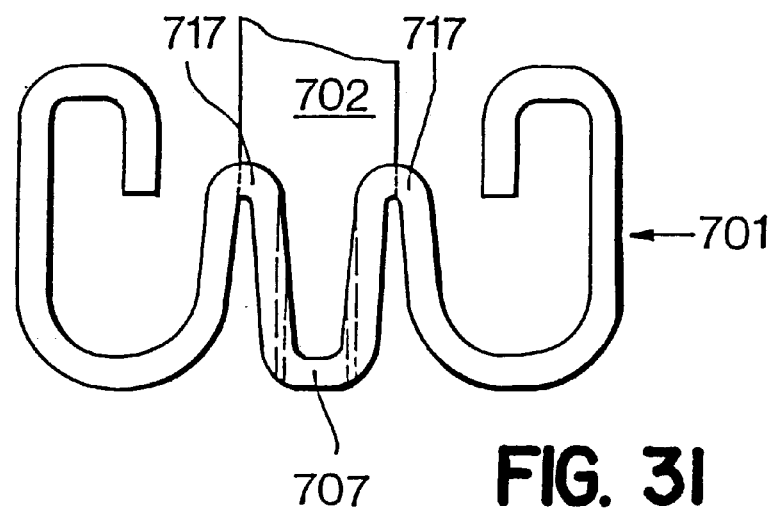
FIG. 31 is a front view of the bottom rail according to FIG. 30.

Three dimensional snap-in holes, as provided for the rail 601 of the embodiment according to FIGS. 25 to 29, can be realized in a different way than with the difficult to produce, tooth-like material sections 617, as the embodiment of the bottom rail of a pair of rails for a motor vehicle seat according to FIGS. 30 to 32 shows. The snap-in holes 706, spaced equidistantly in the center region of the bottom rail 701, have the same shape as the snap-in holes 606; that is, in addition to a span with a component in the longitudinal direction of the bottom rail 701, their longitudinal sides 706' have a span with a component in the direction of movement of the locking teeth 702, of which one is shown in FIG. 31. Even with respect to the polygon shape, the snap-in holes 706 conform with the snap-in holes 606.

Figure 26:
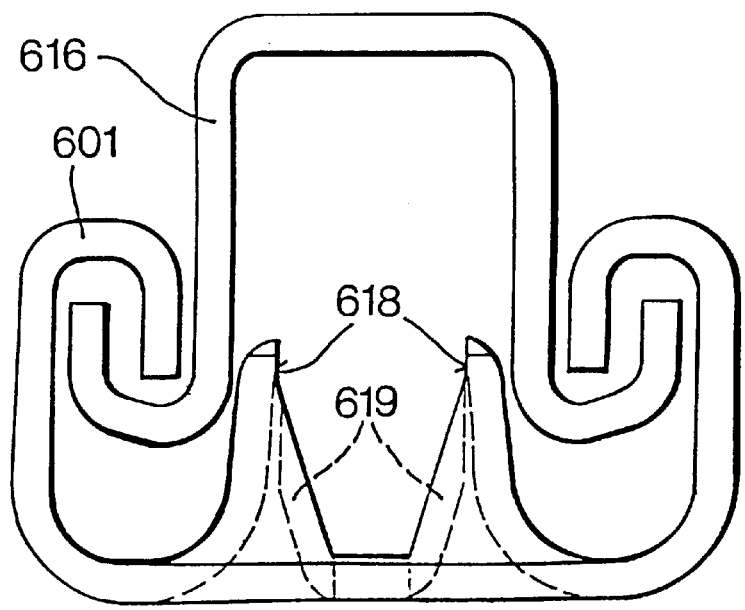
FIG. 26 is a front view of a pair of rails for a car seat with the fifth embodiment of the locking device of the invention without the locking teeth.

In contrast with the embodiment according to FIGS. 25 to 27, the strip-shaped longitudinal sides 706' of the snap-in holes 706 are not formed by tooth-like material sections, but by two toroidal material sections 717, which run parallel to each other and in the longitudinal direction of the rail. In the embodiment each of the two toroidal material sections 717 is formed by a raised fold of the strip material, from which the bottom rail 701 is formed. In contrast to the tooth-like material sections 617, the toroidal material sections 717 can be produced in a relatively simple manner, namely by a suitable cross deformation of the strip material, from which the bottom rail 701 is produced. As shown in FIGS. 30 and 31, the bottom rail 701 has an undulating cross sectional profile, owing to the two toroidal material sections 717 in the region of the one to the other toroidal material section.

The snap-in holes 706 are punched out of their longitudinal center region prior to the transverse deformation of the bottom rail 701. During the subsequent transverse deformation the longitudinal sides 706', which define the center segment 718 and the two end segments 719 of the strip-shaped longitudinal sides 706', which define a three dimensional polygon, are moved into the position, which is shown in FIGS. 30 and 31 and in which the toroidal material sections 717 and the webs 707 form an undulating cross sectional profile.

The advantages of the three dimensional snap-in hole 706 are the same as those of the snap-in holes 606. Furthermore, for more details reference can be made to the explanations to the embodiment according to FIGS. 25 to 29, provided there is conformity.

Whether there is space between two adjacent locking teeth as in the case of the embodiment according to FIGS. 12 to 15, or without spaces as in embodiments with locking teeth arranged in succession, an individual locking tooth is loaded with the entire stress acting in the direction of adjustment of the locked parts. Since this shear and/or flexural stress can be very high, for example, during a crash, the dimensions of each locking tooth have to be adequately strong.

A weaker dimensioning is possible, as explained with respect to the embodiment according to FIGS. 16 to 20, if there are a number of locking teeth that is greater than the minimum number of locking teeth required for a tight lock in all positions of adjustment. However, a weaker dimensioning of the locking teeth is possible, if, as in the embodiment according to FIGS. 33 to 38, they are also braced in the end segment, engaging with the snap-in holes, in the longitudinal direction of the rail, thus in the region of their faces.

Figures 35, 36:
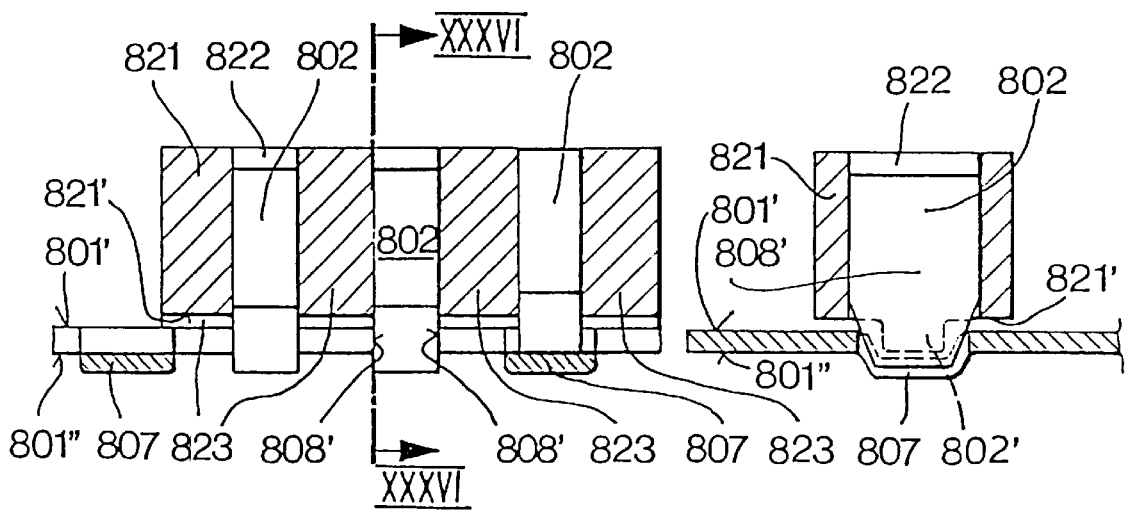
FIG. 35 is a longitudinal view along the line XXXV—XXXV of the holder according to FIG. 33.
FIG. 36 is a cross sectional view along the line XXXVI—XXXVI of the holder according to FIG. 33.
Figures 37, 38:
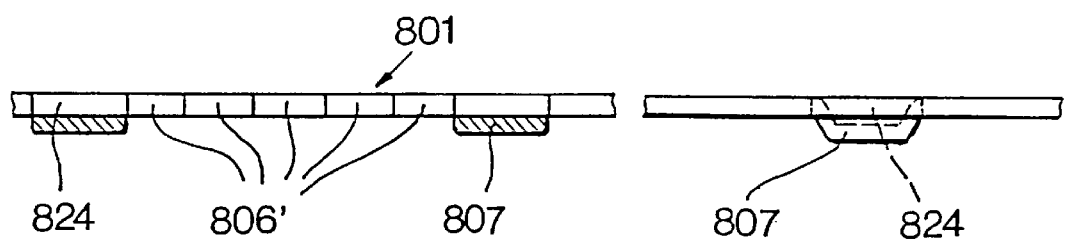
FIG. 37 is a sectional view along the line XXXVII—XXXVII of FIG. 34.
FIG. 38 is a front view of the rail of FIG. 34.

It is possible to brace in such a manner the identical locking teeth 802 over their entire length, thus also in the region of their end segments 802', which engage with the snap-in holes 806 of a rail 801, with a holder 821, which has the shape of a square in the embodiment. As FIG. 33 shows, the holder is penetrated in the locking teeth's 802 sliding direction by guide channels 822, whose rectangular cross sectional profile is adapted to the corresponding cross sectional profile of the locking teeth 801, so that said locking teeth are guided without play. As FIG. 33 shows, the locking teeth 801 are spaced apart, as in the embodiment according to FIGS. 12 to 15, said distance being selected equal to the locking teeth's 801 thickness measured in the longitudinal direction of the rail. The underside 821' of the holder 821 is arranged with as little distance as possible above the rail's 801 upper side 801' facing the holder 821, as shown in FIG. 35. Support members 823, which are designed as one piece with the holder 821, project beyond the underside 821'. These support members 823, which are separated from each other by the guide channels 822, form a row aligned with the longitudinal center plane of the guide channels 822. The dimensions of the support members 823 in the longitudinal direction of this row is equal to the space between two adjacent guide channels 822, in order to put as high a load as possible on the support members 823. As FIG. 36 illustrated, the projection of the support members 823 beyond the underside 821' is approximately equal to the thickness of the rail 801. Furthermore, FIG. 36 illustrates that the tooth-shaped profile of the support members 823 is adjusted in such a manner with respect to the profile of the locking teeth's 802 end segment 802', which penetrates into the snap-in holes 806, that the support member 823 projects neither sideways nor downwardly beyond the profile of the end segment 802'.

The support members 823 make it necessary to provide the rail's 801 side facing the holder 821 with a longitudinal groove 824, which is open in the direction of the holder 821 and which is formed by the correspondingly formed webs 807. Measured from the upper side 801' of the rail 801, the depth of the longitudinal groove 824 is approximately equal to the thickness of the material from which the rail 801 is made. Thanks to the longitudinal groove 824, with which the support members 823 mate, the latter do not prevent the rail 801 from being slid longitudinally relative to the holder 821.

As especially evident from FIGS. 35 and 36, in the region of their faces 808' those locking teeth 802 that engage with at least one of the snap-in holes 806 are braced not only in the section that lies above the underside 821' of the holder 821 in the same, but also especially in the end segment 802', which protrudes downwardly beyond the underside 821' and rests against the longitudinal sides 806' of the snap-in holes 806, and almost as far as the rail's 801 bottom side 801', facing away from the holder 821. The load on the locking teeth 802 is reduced by this support method, a feature that enables a weaker dimensioning of the locking teeth 802.

Insofar as one of the locking teeth is aligned with one of the webs forming the longitudinal groove 824, this situation being the case with the locking tooth 802 depicted on the right in FIG. 35, this locking tooth 802 drops in the longitudinal groove 824 as far as the seat on the groove bottom, but does not contribute to the locking procedure.

Since the locking teeth 802 in the embodiment do not protrude beyond the upper side of the holder 821 and, therefore, cannot be grasped in the region of their upper end segment by a lifting mechanism, arranged outside the holder 821, in order to convey into the release position, the locking teeth 802 in the embodiment are connected to the holder 821 by means of pins and slots, which receive said pins and run in the sliding direction of the locking teeth 802. The slots do not have a negative impact on the locking teeth 802 dropping into one of the snap-in holes, a feature that is facilitated by springs (not illustrated). However, they define the locking teeth's 802 maximum path of displacement relative to the holder 821. Therefore, it is possible to convey all of the locking teeth 802 together into the release position by moving the holder 821 away from the rail 801.

A holder designed in principle like the holder 821 can also be used if the locking teeth are arranged in succession without space, as in the case of the embodiment according to FIGS. 16 to 20. Of course, then support members could be provided only on the two front ends of the holder, so that the first and last locking tooth of the row of locking teeth could be braced by one of the support members at the face facing away from the other locking teeth.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. Locking device comprising:
   a) a rail having a longitudinal direction and a span and a plurality of snap-in holes which are separated from each other by web material sections, said web material sections having the same width in the longitudinal direction of the rail;
   b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
   c) the span of said snap-in holes is greater in the longitudinal direction of said rail than a dimension of each locking tooth in the longitudinal direction; wherein
   d) an inside width of the snap-in holes changes continuously in the longitudinal direction of the rail, said inside width being measured at right angles to the longitudinal direction of the rail; wherein
   e) surfaces, resting against each other without play in one locking direction and in a locking position, are formed by at least one of two longitudinal sides, defining the inside width of the snap-in holes, and at least one of two locking tooth-contact areas facing the longitudinal sides; and wherein
   at least one of the two longitudinal sides of each snap-in hole defines a polygon edge profile with linear segments.

2. Locking device comprising:
   a) a rail having a longitudinal direction and a span and a plurality of snap-in holes which are separated from each other by web material sections, said web material sections having the same width in the longitudinal direction of the rail;
   b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
   c) the span of said snap-in holes is greater in the longitudinal direction of said rail than a dimension of each locking tooth in the longitudinal direction; wherein
   d) an inside width of the snap-in holes changes continuously in the longitudinal direction of the rail, said inside width being measured at right angles to the longitudinal direction of the rail; and wherein
   e) surfaces, resting against each other without play in one locking direction and in a locking position, are formed by at least one of two longitudinal sides, defining the inside width of the snap-in holes, and at least one of two locking tooth-contact areas facing the longitudinal sides; and wherein
   the longitudinal sides of each snap-in hole are slope-free in the direction of movement of the locking teeth.

3. Locking device comprising:
   a) a rail having a longitudinal direction and a span and a plurality of snap-in holes which are separated from each other by web material sections, said web material sections having the same width in the longitudinal direction of the rail;
   b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
   c) the span of said snap-in holes is greater in the longitudinal direction of said rail than a dimension of each locking tooth in the longitudinal direction; wherein
   d) an inside width of the snap-in holes changes continuously in the longitudinal direction of the rail, said inside width being measured at right angles to the longitudinal direction of the rail; and wherein
   e) surfaces, resting against each other without play in one locking direction and in a locking position, are formed by at least one of two longitudinal sides, defining the inside width of the snap-in holes, and at least one of two locking tooth-contact areas facing the longitudinal sides; and wherein
   the longitudinal sides of the snap-in holes have, in addition to the span with a component in the longitudinal direction of the rail, a span with a component in the direction of movement of the locking teeth.

4. Locking device, as in claim 3, wherein the longitudinal sides of the snap-in holes have the shape of a strip, which extend continuously from one of the two traverse sides with one component each in the longitudinal direction of the rail, in the transverse direction of the rail and in the direction of movement of the locking teeth to a center segment, extending in the longitudinal direction of the rail, and from said segment with one component each in the longitudinal direction of the rail, in the transverse direction of the rail and in the direction of movement of the locking teeth to the other cross side.

5. Locking device, as recited in claim 3, wherein the longitudinal sides of the snap-in holes are formed by tooth material sections, which project beyond the side of the webs of the rail in the sliding direction of the locking teeth, said side facing the locking teeth.

6. Locking device, as recited in claim 3, wherein the longitudinal sides of the snap-in holes are formed by two toroidal material sections, which extend in the longitudinal direction of the rail.

7. Locking device, as recited in claim 6, wherein the toroidal material sections are formed by two raised folds of the rail.

8. Locking device, as recited in claim 7, wherein the rail has an undulating cross sectional profile in the region from the one to the other toroidal material section.

9. Locking device, as recited in claim 5, wherein the tooth material sections are designed as hollow bodies, which are open in the direction of the tooth material section, forming the opposite longitudinal side of the snap-in hole, and in the direction of the rail's side facing away from the locking teeth, and wherein their bow-like end face, facing the opposite tooth material section, forms the longitudinal side of one of the snap-in holes.

10. Locking device, as recited in claim 5, wherein the tooth material sections are designed as one piece with the rail.

11. Locking device, as recited in claim 10, wherein the longitudinal sides of the snap-in holes have, in addition to the span with a component in the longitudinal direction of the rail, a span with a component in the direction of movement of the locking teeth, wherein the longitudinal sides of the snap-in holes are formed by tooth material sections, which project beyond the side of the webs of the rail in the sliding direction of the locking teeth, said side facing the locking teeth, wherein the tooth material sections are designed as one piece with the rail, wherein in the region of the locking teeth that engages with the snap-in holes the maximum width, measured in the longitudinal direction of the rail, is at least equal to the maximum inside width of the snap-in holes on the rail side facing the locking teeth.

12. Locking device, as recited in claim 11, wherein at least in the region of the locking teeth that engages with the snap-in holes the longitudinal edges of said locking teeth are rounded off.

13. Locking device, as recited in claim 11, wherein at least in the region of the locking teeth that engages with the snap-in holes at least one of the two locking tooth-contact areas has a shape that is similar at least to the shell of a truncated cone.

14. Locking device, as recited in claim 11, wherein for a double trapezoidal edge profile of the snap-in holes in the region engaging with the snap-in holes at least the one of the two locking tooth-contact areas includes two flat regions, which are sloped not only with respect to the direction of movement of the locking tooth but also define an edge profile adapted to the edge profile of the snap-in holes.

15. Locking device, as recited in claim 11, wherein for a double trapezoidal edge profile of the snap-in holes in the region engaging with the snap-in holes at least one of the two locking tooth-contact areas includes two flat regions, which are sloped not only with respect to the direction of movement of the locking tooth but also define an edge profile adapted to the edge profile of the snap-in holes, wherein the end faces of the snap-in holes lie in a plane that is parallel to each other and extends in the transverse direction of the rail, said end faces defining the webs.

16. Locking device, as recited in claim 15, wherein the length of the snap-in holes is an integral multiple of the thickness of the locking teeth, said length and thickness being measured in the longitudinal direction of the rail.

17. Locking device, recited in claim 16, wherein the thickness of the locking teeth is equal to the thickness of the webs; said thickness being measured in the longitudinal direction of the rail.

18. Locking device as recited in claim 6, wherein the two toroidal material sections extend over the entire length of the rail.

19. Locking device comprising:
a) a rail having a longitudinal direction and a span and a plurality of snap-in holes which are separated from each other by web material sections, said web material sections having the same width in the longitudinal direction of the rail;
b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
c) the span of said snap-in holes is greater in the longitudinal direction of said rail than a dimension of each locking tooth in the longitudinal direction; wherein
d) an inside width of the snap-in holes changes continuously in the longitudinal direction of the rail, said inside width being measured at right angles to the longitudinal direction of the rail; and wherein
e) surfaces, resting against each other without play in one locking direction and in a locking position, are formed by at least one of two longitudinal sides, defining the inside width of the snap-in holes, and at least one of two locking tooth-contact areas facing the longitudinal sides; and wherein
the number of locking teeth is greater than the number required for a tight lock in any position of the parts to be locked.

20. Locking device comprising:
a) a rail having a longitudinal direction and a span and a plurality of snap-in holes which are separated from each other by web material sections, said web material sections having the same width in the longitudinal direction of the rail;
b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
c) the span of said snap-in holes is greater in the longitudinal direction of said rail than a dimension of each locking tooth in the longitudinal direction; wherein
d) an inside width of the snap-in holes changes continuously in the longitudinal direction of the rail, said inside width being measured at right angles to the longitudinal direction of the rail; and wherein
e) surfaces, resting against each other without play in one locking direction and in a locking position, are formed by at least one of two longitudinal sides, defining the inside width of the snap-in holes, and at least one of two locking tooth-contact areas facing the longitudinal sides; and wherein the locking teeth are arranged side-by-side in the longitudinal direction of the rail with a space corresponding to their thickness.

21. Locking device, as recited in claim 20, wherein there is such a number of locking teeth that all of the locking teeth are allowed to fall simultaneously into any one of the snap-in holes.

22. Locking device comprising:
a) a rail having a longitudinal direction and a span and a plurality of snap-in holes which are separated from each other by web material sections, said web material sections having the same width in the longitudinal direction of the rail;
b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
c) the span of said snap-in holes is greater in the longitudinal direction of said rail than a dimension of each locking tooth in the longitudinal direction; wherein
d) an inside width of the snap-in holes changes continuously in the longitudinal direction of the rail, said inside width being measured at right angles to the longitudinal direction of the rail; and wherein
e) surfaces, resting against each other without play in one locking direction and in a locking position, are formed by at least one of two longitudinal sides, defining the inside width of the snap-in holes, and at least one of two locking tooth-contact areas facing the longitudinal sides; wherein
the locking teeth are arranged side-by-side in the longitudinal direction of the rail with a space corresponding to their thickness, wherein there is such a number of locking teeth that all of
the locking teeth are allowed to fall simultaneously into any one of the snap-in holes; wherein the locking teeth are arranged side-by-side in the longitudinal direction of the rail with a space corresponding to their thickness, wherein there is such a number of locking teeth that all of the locking teeth are allowed to fall simultaneously into any one of the snap-in holes; and wherein;
all of the locking teeth are spring-loaded starting from their release position and going in the direction of their locking position and can be moved jointly into the release position.

23. Locking device comprising:
a) a rail having a longitudinal direction and a span and a plurality of snap-in holes which are separated from each other by web material sections, said web material sections having the same width in the longitudinal direction of the rail;
b) locking teeth which can be moved in a direction of movement relative to said rail at right angles to the rail span, such that, at least one of said teeth drops into one of the snap-in holes in a locking position and in this locking position rests against said snap-in hole without play in a direction of adjustment, whereby at least one of a surface making contact is sloped relative to said locking teeth direction of movement; wherein
c) the span of said snap-in holes is greater in the longitudinal direction of said rail than a dimension of each locking tooth in the longitudinal direction; wherein
d) an inside width of the snap-in holes changes continuously in the longitudinal direction of the rail, said inside width being measured at right angles to the longitudinal direction of the rail; and wherein
e) surfaces, resting against each other without play in one locking direction and in a locking position, are formed by at least one of two longitudinal sides, defining the inside width of the snap-in holes, and at least one of two locking tooth-contact areas facing the longitudinal sides; wherein
f) the locking teeth can be slid longitudinally in a holder, beyond whose underside facing the rail project the locking teeth's end segments engaging with the snap-in holes in the locking position;
g) beyond this underside of the holder projects at least one support member of the holder, against which the end segment of one of the locking teeth can brace itself with its face extending in the transverse direction of the rail, when said end segment is in its locking position; and wherein
h) the rail exhibits in the center region formed by the web material sections the rail includes a longitudinal groove, which is interrupted by the snap-in holes, in order to receive each existing support member.

24. Locking device, as recited in claim 23, wherein in arranging the locking teeth in a row that allows mutual support in the longitudinal direction of the rail, the one support member is allocated to the locking tooth forming the beginning of the row and the other support member is allocated to the locking tooth forming the other end.

25. Locking device, as recited in claim 24, wherein in arranging the locking teeth in the holder at a distance from each other, the end segment of all of the locking teeth is brace against the support members on both sides.

26. Locking device, as recited in claim 25, wherein the holder is designed as a lifting mechanism, by means of which all of the locking teeth can be moved jointly into their release position.

27. Locking device, as recited in claim 26, wherein the holder is formed by a block.

* * * * *